US009513986B2

(12) United States Patent
Huang

(10) Patent No.: US 9,513,986 B2
(45) Date of Patent: Dec. 6, 2016

(54) SIGNAL AUTO-TUNING SYSTEM AND METHOD OF USING THE SAME

(71) Applicants: INVENTEC (PUDONG) TECHNOLOGY CORPORATION, Shanghai (CN); INVENTEC CORPORATION, Taipei (TW)

(72) Inventor: Wen Cheng Huang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 14 days.

(21) Appl. No.: 14/684,452

(22) Filed: Apr. 13, 2015

(65) Prior Publication Data

US 2016/0154695 A1 Jun. 2, 2016

(30) Foreign Application Priority Data

Nov. 27, 2014 (CN) .......................... 2014 1 0698257

(51) Int. Cl.
*G06F 11/00* (2006.01)
*G06F 11/07* (2006.01)

(52) U.S. Cl.
CPC ......... *G06F 11/0793* (2013.01); *G06F 11/079* (2013.01); *G06F 11/0727* (2013.01); *G06F 11/0751* (2013.01); *G06F 11/0787* (2013.01)

(58) Field of Classification Search
CPC .. H04N 1/32619; H04N 19/61; H04N 19/166; H04N 19/115; H04L 1/1812; H04L 1/18; H04L 1/1825; H04L 1/1877; H04L 1/0002; H04L 1/0016; H04L 1/0015; H04L 1/0035; H04L 1/0017; G06F 11/0793; G06F 11/0727; G06F 11/079; G06F 11/0787; G06F 11/0751
See application file for complete search history.

(56) References Cited

U.S. PATENT DOCUMENTS

| | | | | |
|---|---|---|---|---|
| 2001/0027486 | A1* | 10/2001 | Takamoto | H04L 1/1809 709/227 |
| 2004/0181740 | A1* | 9/2004 | Tomaru | H04L 1/1812 714/776 |
| 2006/0258291 | A1* | 11/2006 | Nakata | H04L 1/1825 455/67.11 |
| 2007/0037602 | A1* | 2/2007 | Shimizu | H04L 1/0001 455/550.1 |
| 2007/0092020 | A1* | 4/2007 | Seki | H04L 1/0069 375/267 |
| 2011/0310797 | A1* | 12/2011 | Kobayashi | H04L 1/1887 370/328 |

(Continued)

*Primary Examiner* — Guerrier Merant
(74) *Attorney, Agent, or Firm* — Mark M. Friedman

(57) ABSTRACT

A signal auto-tuning system is provided, which comprises a host, a controller, an expander, and a storage unit. The expander comprises a first error counting unit, a second error counting unit, an error-count temporary table, an error-count evaluating unit, and an adjusting unit. The expander receives/transmits a first signal with relation to the controller, and the expander receives/transmits a second signal with relation to the storage unit. The adjusting unit determines whether to adjust either of the first signal and the second signal, based on a result determined by the error-count evaluating unit.

5 Claims, 3 Drawing Sheets

(56) References Cited

U.S. PATENT DOCUMENTS

2012/0099606 A1* 4/2012 Sato .............. H04N 21/23655
  370/468
2013/0094475 A1* 4/2013 Song .............. H04W 36/0094
  370/332

* cited by examiner

SIGNAL AUTO-TUNING SYSTEM AND METHOD OF USING THE SAME

BACKGROUND OF THE INVENTION

Field of Invention

The present invention relates to a signal auto-tuning system and a method of using the same, and in particular to a system for serially connecting with a SCSI (Serial Attached SCSI, SAS) standard interface and a method of using the same.

Description of Prior Art

In the prior hosts such as servers, different electronic devices (e.g. controllers, storage units and so forth) need to electrically connect with expanders, respectively, wherein all signals settings (commonly referred to as signal integrity, SI) for different electronic devices are stored in the firmware of the expander, and the signals settings are constant values, which makes the firmware of the expander unable to change the signals settings automatically while the expander is being connected with other different kinds of controllers or storage units.

Practically, different types of storage units leaving the factory have different preset strengths of signals settings. During signal transmission, when strengths of the signals settings of some types of storage units are lower than strength of a preset signal, the storage units will be unable to be detected precisely, and storage units might be lost (HDD lost issues, which means storage units are actually connected with the expander but are unable to be detected). Besides, the distances from each expander and each controller of each host are different; when the distance is too far, a signal connection problem might occur between the controller and the expander.

SUMMARY OF THE INVENTION

An objective of the present invention is to provide a signal auto-tuning system to solve the above problem.

To achieve the above objective, the present invention provides a signal auto-tuning system. The system comprises a host, a controller, an expander, and a storage unit.

The controller is configured to receive/transmit a signal with relation to the host. The expander is configured to connect with the controller and to receive/transmit a first signal with relation to the controller. The storage unit is configured to store data and to receive/transmit a second signal with relation to the expander.

The expander comprises a first error counting unit, a second error counting unit, an error-count temporary table, an error-count evaluating unit, and an adjusting unit. The first error counting unit is configured to count a first retransmission count of the first signal for a first interval. The second error counting unit is configured to count a second retransmission count of the second signal for a second interval. The error-count temporary table is configured to respectively store the first retransmission count and the second retransmission count. The error-count evaluating unit is configured to respectively determine whether the first retransmission count and the second retransmission count are abnormal or not. The adjusting unit is configured to determine whether to adjust the first signal and the second signal, based on a result determined by the error-count evaluating unit.

In one preferred embodiment, the expander further comprises a signal temporary table configured to store both the first signal and the second signal.

In one preferred embodiment, the expander further comprises a signal evaluating unit configured to determine whether the first signal is higher than a first preset maximum signal and whether the second signal is higher than a second preset maximum.

In one preferred embodiment, the host further comprises an output unit. The output unit is configured to output a message indicative of the controller malfunctioning when the first signal is higher than the first preset maximum and to output another message indicative of the storage unit malfunctioning when the second signal is higher than the second preset maximum signal.

An objective of the present invention is to provide a method for a signal auto-tuning system to solve the above problem.

To achieve the above objective, the present invention provides a method for a signal auto-tuning system. The system comprises a host, a controller, an expander, and storage unit. The controller is configured to receive/transmit a signal with relation to the host. The expander is configured to connect with the controller and to receive/transmit a first signal with relation to the controller. The storage unit is configured to store data and to receive/transmit a second signal with relation to the expander. The expander comprises a first error counting unit, a second error counting unit, an error-count temporary table, an error-count evaluating unit, and an adjusting unit. The method comprises:

Counting a first retransmission count first signal for a first interval by the first error counting unit.

Counting a second retransmission count of the second signal for a second interval by the second error counting unit.

Storing respectively the first retransmission count and the second retransmission count in the error-count temporary table.

Determining respectively whether the first retransmission count is higher than a first preset maximum retransmission count and whether the second retransmission count is higher than a second preset maximum retransmission count by the error-count evaluating unit.

Raising the first signal by the adjusting unit, while the first retransmission count is higher than the first preset maximum retransmission count.

Raising the second signal by the adjusting unit, while the second retransmission count is higher than the second preset maximum retransmission count.

In one preferred embodiment, the expander further comprises a signal temporary table and a signal evaluating unit, the method further comprises:

Storing both the first signal and the second signal in the signal temporary table.

Determining whether the first signal is higher than a first preset maximum signal and whether the second signal is higher than a second preset maximum signal, by the signal evaluating unit.

In one preferred embodiment, the host further comprises an output unit, the method fluffier comprises:

Outputting a message indicative of the controller malfunctioning, when the first signal is higher than the first preset maximum signal.

Outputting another message indicative of the storage unit malfunctioning, when the second signal is higher than the second preset maximum signal.

With storing the first retransmission count and the second retransmission count in the error-count temporary table of the expander, determining whether the first retransmission count and the second retransmission count is abnormal (usually, the signal is too weak when the retransmission counts are too high, which causes the signal to be re-sent continuously) or not, by the error-count evaluating unit of the expander, and determining whether to adjust the first signal and the second signal by the adjusting unit, based on a result determined by the error-count evaluating unit. The above steps are directly computed in the expander, which accomplishes the purpose of auto-tuning the signal dynamically.

DETAILED DESCRIPTION OF THE PREFERRED EMBODIMENTS

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

Figure 1:
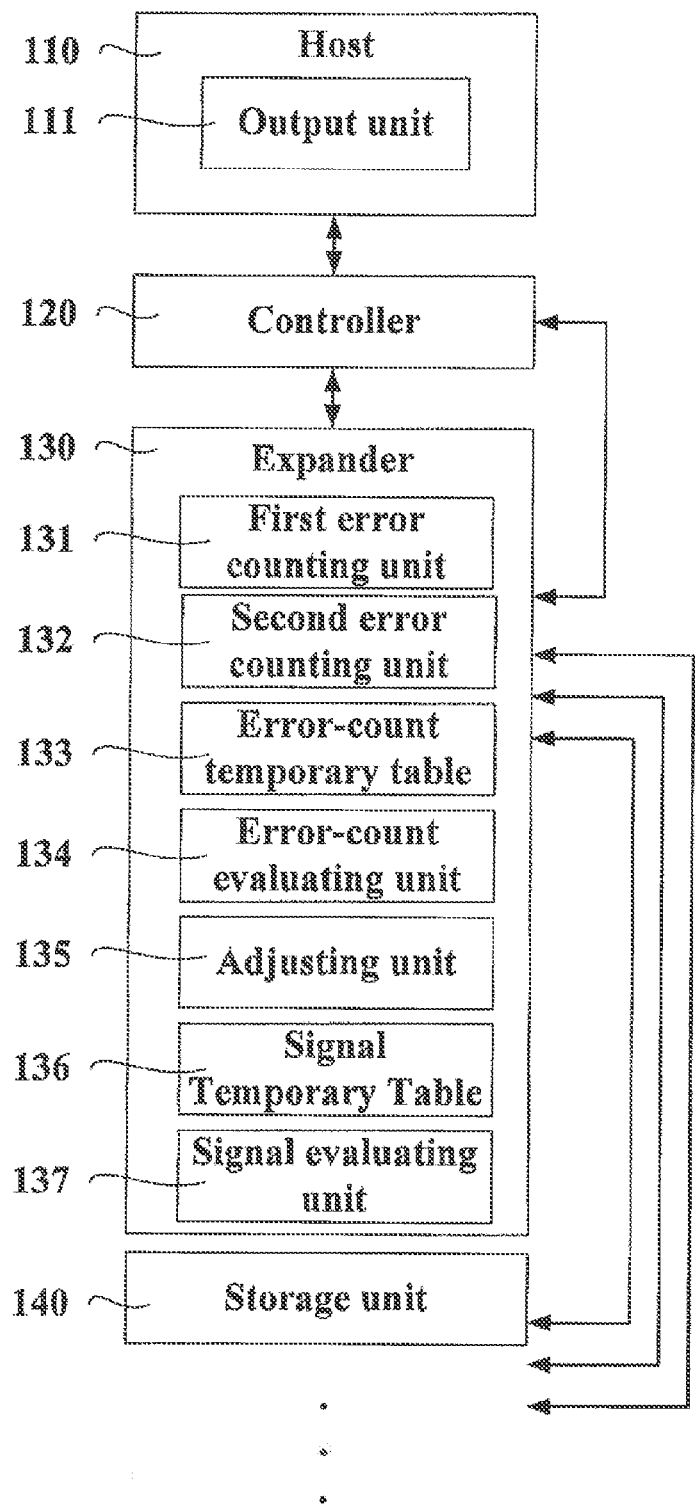
FIG. 1 is a schematic drawing of a signal auto-tuning system of one embodiment of the present invention.

FIG. 1 is a schematic drawing of a signal auto-tuning system 100 of one embodiment of the present invention. The system 100 comprises a host 110, a controller 120, an expander 130, and a storage unit 140.

The host 110 (such as a server comprises an output unit 111. The controller 120 is configured to receive/transmit a signal with relation to the host 110. The expander 130 is configured to connect with the controller 120 and to receive/transmit a first signal with relation to the controller 120. The storage unit 140 is configured to store data and to receive/transmit a second signal with relation to the expander 130. It should be understood that a plurality of storage units 140 are like a hard disk array, the plurality of storage units 140 receive/transmit a plurality of second signals with relation to the expander 130.

The expander 130 comprises a first error counting unit 131, a second error counting unit 132, an error-count temporary table 133, an error-count evaluating unit 134, an adjusting unit 135, a signal temporary table 136, and a signal evaluating unit 137. The first error counting unit 131 is configured to count a first retransmission count of the first signal for a first interval. The second error counting unit 132 is configured to count a second retransmission count of the second signal for a second interval. The error-count temporary table 133 is configured to respectively store the first retransmission count and the second retransmission count. The error-count evaluating unit 134 is configured to respectively determine whether the first retransmission count and the second retransmission count are abnormal or not. "Abnormal" indicates that the first retransmission count is higher than a first preset maximum retransmission count and/or the second retransmission count is higher than a second preset maximum retransmission count. The adjusting unit 135 is configured to adjust the first signal and the second signal, based on a result determined by the error-count evaluating unit. In other words, when the error-count evaluating unit 134 determines that the first retransmission count is higher than the first preset maximum retransmission count, the adjusting unit 135 adjusts the first signal; when the error-count evaluating unit 134 determines that the second retransmission count is higher than the second preset maximum retransmission count, the adjusting unit 135 adjust the second signal.

The settings of the first interval and the second interval are changeable by user's demands before leaving factory. For example, the first interval is 1 second and the first retransmission count is 5, which indicates that the first signal is re-sent 5 times in 1 second because of poor signal quality. The second interval is also 1 second, the second retransmission count is 3 or 7. The first preset maximum retransmission count is 4, the second preset maximum retransmission count is 6. The error-count evaluating unit 134 will determine that the first retransmission count is abnormal (5>4). Then, the adjusting unit 135 adjusts the first signal. The error-count evaluating unit 134 will determine that the second retransmission count is normal (while the second retransmission count is 3, 3<6) or abnormal (while the second retransmission count is 7, 7>6). Then, the adjusting unit 135 only adjusts the second signal while the second retransmission count is higher than the second maximum retransmission count. In the preferred embodiment, only one error-count evaluating unit 134, one adjusting unit 135, and one signal evaluating unit 137 are applied. In other embodiments, the combination of a plurality of error-count evaluating unit 134, a plurality of adjusting unit 135, and a plurality of signal evaluating unit 137 are applied.

The signal temporary table 136 is configured to store both the first signal and the second signal. The signal evaluating unit 137 is configured to determine whether the first signal is higher than a first preset maximum signal and whether the second signal is higher than a second preset maximum signal. Continuing with the above example, both of the first signal and the second signal have upper strength limits. For example, the first signal has 15 levels, and the default setting is level 8 (in factory); in other words, when the error-count evaluating unit 134 determines that the first retransmission count is abnormal, the adjusting unit 135 can raise the first signal level by level (up to level 15). When the signal evaluating unit 137 determines that the first signal is higher than the first preset maximum signal (level 15), the output unit 111 outputs a message indicative of the controller 120 malfunctioning. Similarly, when the signal evaluating unit 137 determines that the second signal is higher than the second preset maximum signal, the output unit 111 outputs a message indicative of the storage unit 140 malfunctioning.

Figure 2A:
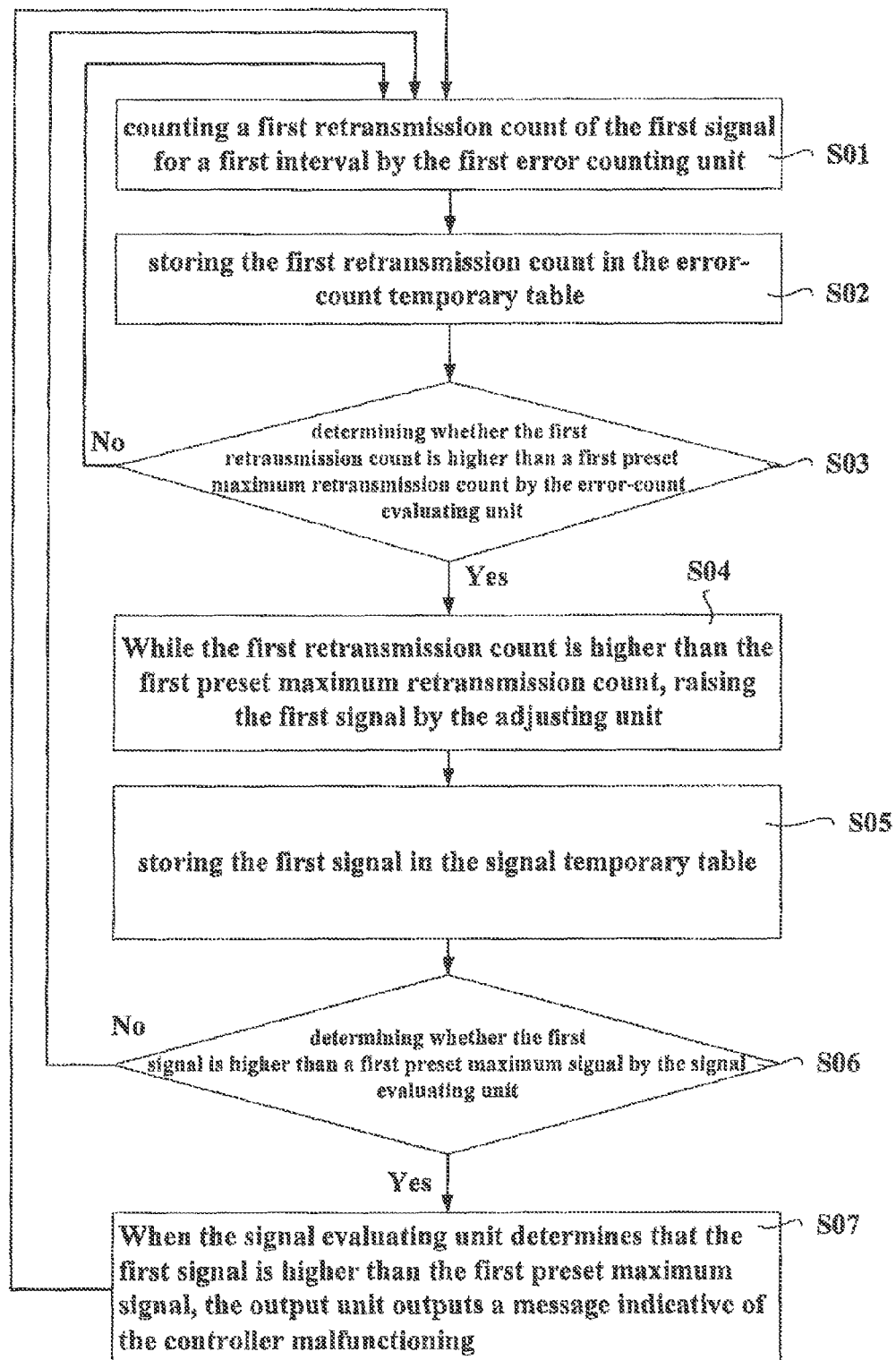
FIG. 2A is a flow chart of a method for a signal auto-tuning system of a first signal of the embodiment of the present invention.

FIG. 2A is a flow chart of a method for a signal auto-tuning system of a first signal of the embodiment of the present invention. The features applied in the method are as mentioned in FIG. 1.

Step S01, counting a first retransmission count of the first signal for a first interval by the first error counting unit 131.

Step S02, storing the first retransmission count in the error-count temporary table 133.

Step S03, determining whether the first retransmission count is higher than a first preset maximum retransmission count by the error-count evaluating unit 134.

While the first retransmission count is higher than the first preset maximum retransmission count, then proceed to step S04, raising the first signal by the adjusting unit 135.

Step S05, storing the first signal in the signal temporary table 136.

Step S06, determining whether the first signal is higher than a first preset maximum signal by the signal evaluating unit 137.

When the signal evaluating unit 137 determines that the first signal is higher than the first preset maximum signal, then proceed to step S07, the output unit 111 outputs a message indicative of the controller 120 malfunctioning. Then, back to step S01, continuing to record and inspect the first retransmission count to prevent the device from being lost (like the HD lost issues mentioned before) due to insufficient signals.

In step S03, while the first retransmission count is lower than the first preset maximum retransmission count, back to step S01, continuing to record and inspect the first retransmission count to prevent the device from being lost (like the HD lost issues mentioned before) due to insufficient signals.

In step S06, when the signal evaluating unit 137 determines that the first signal is lower than the first preset maximum signal, then proceed back to step S01, continuing to record and inspect the first retransmission count to prevent the device from being lost (like the HD lost issues mentioned before) due to insufficient signals.

Figure 2B:
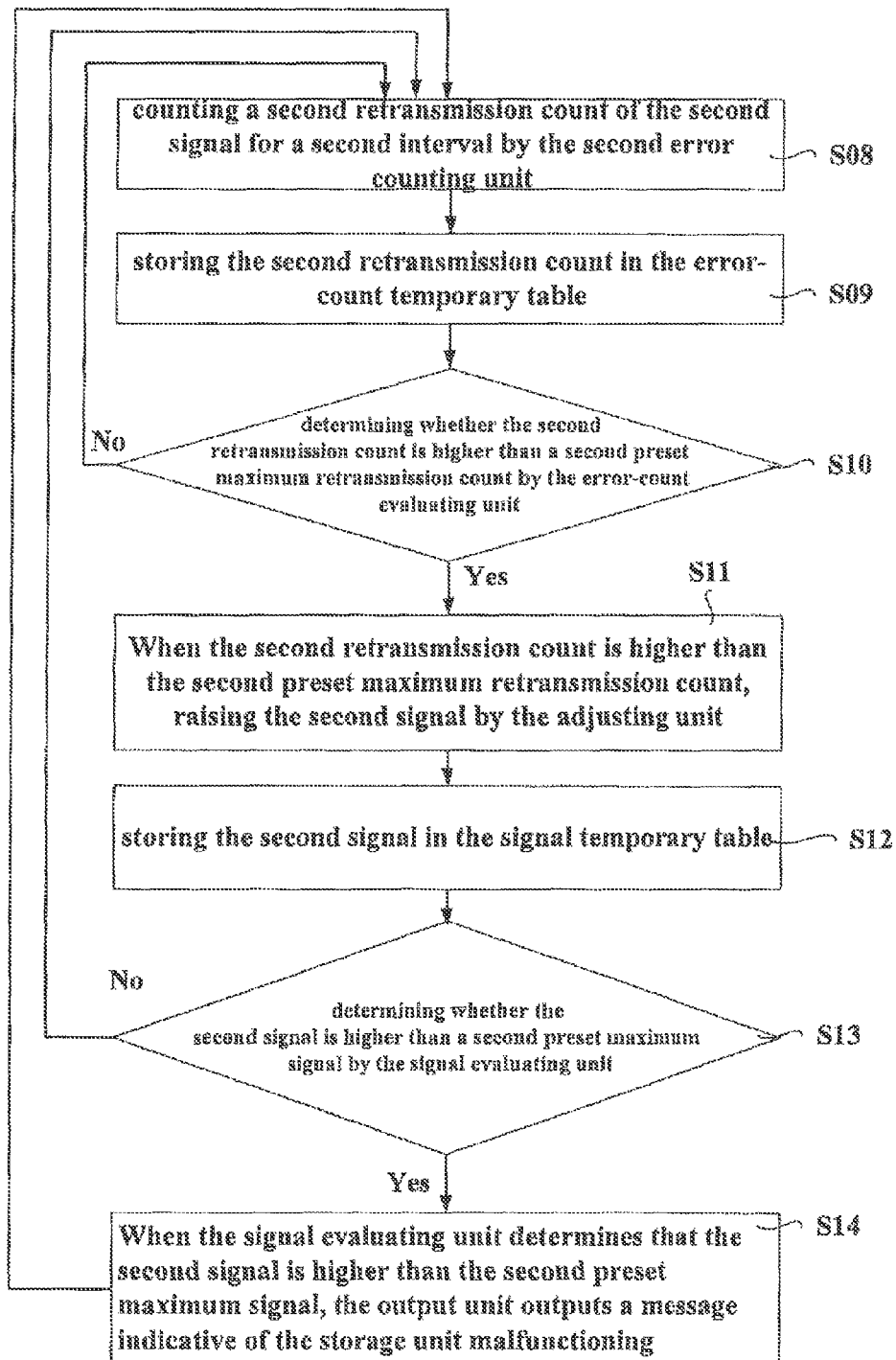
FIG. 2B is a flow chart of a method for a signal auto-tuning system of a second signal of the embodiment of the present invention.

FIG. 2B is a flow chart of a method for a signal auto-tuning system of a second signal of the embodiment of the present invention. The features applied in the method are as mentioned in FIG. 1.

Step S08, counting a second retransmission count of the second signal for a second interval by the second error counting unit 132.

Step S09, storing the second retransmission count in the error-count temporary table 131.

Step S10, determining whether the second retransmission count is higher than a second preset maximum retransmission count by the error-count evaluating unit 134.

When the second retransmission count is higher than the second preset maximum retransmission count, then proceed to step S11, raising the second signal by the adjusting unit 135.

Step S12, storing the second signal in the signal temporary table 136.

Step S13, determining whether the second signal is higher than a second preset maximum signal by the signal evaluating unit 137.

When the signal evaluating unit 137 determines that the second signal is higher than the second preset maximum signal, then proceed to step S14, the output unit 111 outputs a message indicative of the storage unit 140 malfunctioning. Then, back to step S08, continuing to record and inspect the second retransmission count to prevent the device from being lost (like the HD lost issues mentioned before) due to insufficient signals.

In step S10, when the second retransmission count is lower than the second preset maximum retransmission count, back to step S08, continuing to record and inspect the second retransmission count to prevent the device from being lost (like the HD lost issues mentioned before) due to insufficient signals.

In step S13, when the signal evaluating unit 137 determines that the second signal is lower than the second preset maximum signal, then back to step S08, continuing to record and inspect the second retransmission count to prevent the device from being lost (like the HD lost issues mentioned before) due to insufficient signals.

As mentioned above, the present invention is able to respectively detect, determine, and adjust the first signal and the second signal. Of course, it is able to detect, determine, and adjust the first signal and the second signal at the same time based on the user's demands.

In the preferred embodiments given above, the first signal and the second signal could be used to describe SI (Signal integrity), the controller 120 could be a SAS controller.

As mentioned above, the present invention keeps recording the retransmission counts between the devices (controller 120, storage unit 140) and the expander 130, and automatically and dynamically adjusts the strength of the signal according to the retransmission counts. Hence, the problem of fixed signals settings of the prior art can be solved by the present invention.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A signal auto-tuning system, comprising:
    a host;
    a controller configured to receive/transmit a signal with relation to the host;
    an expander configured to connect with the controller and to receive/transmit a first signal with relation to the controller; and
    at least one storage unit configured to store data and to receive/transmit at least one second signal with relation to the expander,
    wherein the expander comprises a first error counting unit, at least one second error counting unit, an error-count temporary table, an error-count evaluating unit, and an adjusting unit, the first error counting unit is configured to count a first retransmission count of the first signal for a first interval, the at least one second error counting unit is configured to count at least one second retransmission count of the at least one second signal for a second interval, the error-count temporary table is configured to respectively store the first retransmission count and the at least one second retransmission count, the error-count evaluating unit is configured to respectively determine whether the first retransmission count and the at least one second retransmission count is abnormal or not, and the adjusting unit is configured to determine whether to adjust the first signal and the at least one second signal, based on a result determined by the error-count evaluating unit;
    wherein the expander further comprises a signal evaluating unit configured to determine whether the first signal is higher than a first preset maximum signal and whether the at least one second signal is higher than a second preset maximum signal; and
    wherein the host further comprises an output unit configured to output a message indicative of the controller malfunctioning when the first signal is higher than the first preset maximum signal, and to output another message indicative of the at least one storage unit malfunctioning when the at least one second signal is higher than the second preset maximum signal.

2. The system according to the claim 1, wherein the expander further comprises a signal temporary table configured to store both the first signal and the at least one second signal.

3. A signal auto-tuning system, comprising:
    a host;

a controller configured to receive/transmit a signal with relation to the host;
an expander configured to connect with the controller and to receive/transmit a first signal with relation to the controller; and
at least one storage unit configured to store data and to receive/transmit at least one second signal with relation to the expander,
wherein the expander comprises a first error counting unit, at least one second error counting unit, an error-count temporary table, an error-count evaluating unit, and an adjusting unit, the first error counting unit is configured to count a first retransmission count of the first signal for a first interval, the at least one second error counting unit is configured to count at least one second retransmission count of the at least one second signal for a second interval, the error-count temporary table is configured to respectively store the first retransmission count and the at least one second retransmission count, the error-count evaluating unit is configured to respectively determine whether the first retransmission count and the at least one second retransmission count is abnormal or not, and the adjusting unit is configured to determine whether to adjust the first signal and the at least one second signal, based on a result determined by the error-count evaluating unit, wherein the expander further comprises a signal temporary table configured to store both the first signal and the at least one second signal;
wherein the expander further comprises a signal evaluating unit configured to determine whether the first signal is higher than a first preset maximum signal and whether the at least one second signal is higher than a second preset maximum signal; and
wherein the host further comprises an output unit configured to output a message indicative of the controller malfunctioning when the first signal is higher than the first preset maximum signal, and to output another message indicative of the at least one storage unit malfunctioning when the at least one second signal is higher than the second preset maximum signal.

4. A method for signal auto-tuning system which comprises a host, a controller, an expander, and at least one storage unit, the controller is configured to receive/transmit a signal with relation to the host, the expander is configured to connect with the controller and to receive/transmit a first signal with relation to the controller, the expander comprises a first error counting unit, at least one second error counting unit, an error-count temporary table, an error-count evaluating unit, and an adjusting unit, the method comprising:
counting a first retransmission count of the first signal for a first interval by the first error counting unit;
counting at least one second retransmission count of the at least one second signal for a second interval by the at least one second error counting unit;
storing respectively the first retransmission count and the at least one second retransmission count in the error-count temporary table;
determining respectively whether the first retransmission count is higher than a first preset maximum retransmission count and whether the at least one second retransmission count is higher than a second preset maximum retransmission count, by the error-count evaluating unit;
raising the first signal by the adjusting unit when the first retransmission count is higher than the first preset maximum retransmission count; and
raising the at least one second signal by the adjusting unit when the at least one second retransmission count is higher than the second preset maximum retransmission count;
wherein the host further comprises an output unit, the method further comprises:
outputting a message indicative of the controller malfunctioning when the first signal is higher than the first preset maximum signal; and
outputting another message indicative of the at least one storage unit malfunctioning when the at least one second signal is higher than the second preset maximum signal.

5. The method according to the claim 4, wherein the expander further comprises a signal temporary table and a signal evaluating unit, the method further comprises:
storing both the first signal and the at least one second signal in the signal temporary table; and
determining whether the first signal is higher than a first preset maximum signal and whether the at least one second signal is higher than a second preset maximum signal by the signal evaluating unit.

* * * * *